(12) United States Patent
Schulze

(10) Patent No.: US 7,914,037 B2
(45) Date of Patent: Mar. 29, 2011

(54) GAS BAG COVER FOR A VEHICLE OCCUPANT RESTRAINT SYSTEM AND METHOD OF MANUFACTURING A GAS BAG COVER

(75) Inventor: Reinhard Schulze, Usingen (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 183 days.

(21) Appl. No.: 11/986,167

(22) Filed: Nov. 20, 2007

(65) Prior Publication Data

US 2008/0116667 A1 May 22, 2008

(30) Foreign Application Priority Data

Nov. 22, 2006 (DE) .......... 10 2006 055 033

(51) Int. Cl.
*B60R 21/20* (2006.01)
(52) U.S. Cl. .................................. 280/728.3
(58) Field of Classification Search ............. 280/728.2, 280/728.3, 731; 40/593
See application file for complete search history.

(56) References Cited

U.S. PATENT DOCUMENTS

| | | | | |
|---|---|---|---|---|
| 5,685,056 A * | 11/1997 | Fischer | ............... | 29/512 |
| 5,775,721 A * | 7/1998 | Grout | ............... | 280/727 |
| 5,851,022 A * | 12/1998 | Yamamoto et al. | ........ | 280/728.3 |
| 5,913,534 A * | 6/1999 | Klingauf | ............... | 280/728.3 |
| 5,928,591 A | 7/1999 | Blumenschein et al. | | |
| 6,158,764 A * | 12/2000 | Preisler et al. | ............ | 280/728.2 |
| 6,209,905 B1 * | 4/2001 | Preisler et al. | ............ | 280/728.2 |
| 6,264,869 B1 * | 7/2001 | Notarpietro et al. | ......... | 264/247 |
| 6,568,701 B1 | 5/2003 | Burdack et al. | | |
| 6,585,288 B2 * | 7/2003 | Nishiura et al. | ........... | 280/728.3 |
| 6,613,415 B2 * | 9/2003 | Iida et al. | ............... | 428/139 |
| 6,692,016 B2 * | 2/2004 | Yokota et al. | ............ | 280/728.2 |
| 7,213,833 B2 * | 5/2007 | Amamori | ............... | 280/728.3 |
| 2001/0030414 A1 * | 10/2001 | Yokota et al. | ............ | 280/728.3 |
| 2002/0050704 A1 * | 5/2002 | Abe | ............... | 280/743.1 |
| 2004/0174002 A1 * | 9/2004 | Sauer | ............... | 280/728.3 |
| 2005/0156410 A1 * | 7/2005 | Yokota et al. | ............ | 280/728.3 |
| 2006/0113755 A1 * | 6/2006 | Yokota et al. | ............ | 280/728.3 |
| 2006/0202449 A1 * | 9/2006 | Yokota et al. | ............ | 280/728.3 |

FOREIGN PATENT DOCUMENTS

| | | |
|---|---|---|
| DE | 29512551 | 2/1996 |
| DE | 29617721 | 3/1997 |
| DE | 29706136 | 7/1997 |
| JP | 09323611 | 12/1997 |
| JP | 10181494 A * | 7/1998 |

* cited by examiner

*Primary Examiner* — Paul N Dickson
*Assistant Examiner* — Robert A Coker
(74) *Attorney, Agent, or Firm* — Tarolli, Sundheim, Covell & Tummino LLP

(57) ABSTRACT

A gas bag cover for a vehicle occupant restraint system has a plastic cap (12) with a front face (14) and a rear face (16) facing a gas bag (17), and a decorative element (18) provided on the front face (14). The decorative element (18) is welded to the plastic cap (12). Furthermore, a method of manufacturing such a gas bag cover (10) is described.

23 Claims, 3 Drawing Sheets

GAS BAG COVER FOR A VEHICLE OCCUPANT RESTRAINT SYSTEM AND METHOD OF MANUFACTURING A GAS BAG COVER

TECHNICAL FIELD

The invention relates to a gas bag cover for a vehicle occupant restraint system, including a plastic cap having a front face and a rear face facing a gas bag, and a decorative element provided on the front face. The invention further relates to a method of manufacturing a gas bag cover.

BACKGROUND OF THE INVENTION

In known gas bag covers, decorative elements, such as an emblem of an automotive manufacturer, ornamental rings or the like, are connected with the plastic cap by rivets. For the rivets to be passed through, the plastic cap is provided with a plurality of apertures, which may lead to a change in strength of the plastic cap.

The invention provides a gas bag cover which distinguishes itself by a simple manufacture and a consistent strength, and further provides a method of manufacturing such a gas bag cover.

According to the invention, a gas bag cover for a vehicle occupant restraint system has a plastic cap with a front face and a rear face facing a gas bag, and a decorative element provided on the front face. The decorative element is welded to the plastic cap.

The gas bag cover according to the invention distinguishes itself by a simple manufacturability, low production costs and a uniform strength.

Preferably, the decorative element is made of plastic, in particular of the same plastic as the plastic cap. This facilitates welding the decorative element to the plastic cap. In addition, especially with a decorative element of large dimensions, a flexible material is particularly useful with a view to a possible activation of the restraint system.

As an alternative, the decorative element may have an outer coating made of plastic, which surrounds a metal core, for example. In this case, the outer coating is preferably made of the same plastic material as the plastic cap.

Owing to the attachment of the decorative element by welding, the plastic cap does without any apertures in the region of the decorative element.

According to a preferred embodiment, the decorative element is formed by a closed curve, in particular a ring, an oval or a trapezoid. Of course, an open curve is also conceivable. Inside and outside of the decorative element, the material of the plastic cap is visible on the front face facing the vehicle occupant.

The external dimensions of the decorative element may correspond to at least a third of the external dimensions of the plastic cap; the decorative element thus has comparatively large dimensions in relation to the overall size of the gas bag cover.

An especially sturdy attachment of the decorative element is obtained in that the front face of the plastic cap has a recessed portion in which the decorative element is arranged. The top face of the decorative element facing the vehicle occupant may then be flush with, or project relative to, the front face of the plastic cap.

To facilitate a precise positioning of the decorative element, both the plastic cap and the decorative element should each have an integrally molded extension which extends into and, as it were, defines the welding zone. The two extensions are then welded directly to each other.

In its visible portion, the decorative element may have an external color which is different from that of the plastic cap on the front face thereof, something which contributes to a visually especially appealing gas bag cover.

A particularly high-quality configuration is obtained if the decorative element has a coating, preferably a metallic coating.

At least on its front face, the plastic cap itself may also have a plurality of regions having different colors. In this case, a parting line between two regions having different colors can be concealed by the decorative element.

According to a second aspect of the invention, a method of manufacturing a gas bag cover is provided, which comprises the following steps. First, a plastic cap and a decorative element, preferably likewise made of plastic, are produced as separate components, for example in a foaming or injection molding process. The decorative element and the plastic cap are then welded to each other. The method according to the invention is simple and therefore cost-effective, and permits a color design of the decorative part that is independent of that of the plastic cap. In addition, when designing the inner face of the plastic cap, there is no need to allow for sufficient free space for riveting tools or the like since rivets for attachment of the decorative element may be dispensed with.

The decorative element is connected with the plastic cap by heated tool welding, for example. Furthermore, ultrasonic welding also constitutes a suitable method.

In accordance with one variant of the method, the decorative element or the plastic cap or both components are coated prior to the welding step, such as with a paint or varnish or by powder coating. As an alternative, the components may be produced to have the desired surfaces from the start, such as by injection molding.

In this connection it should be noted that all of the further configurations mentioned with respect to the gas bag cover can also be employed to advantage in the method according to the invention.

BRIEF DESCRIPTION OF THE PREFERRED EMBODIMENTS

Figure 1:
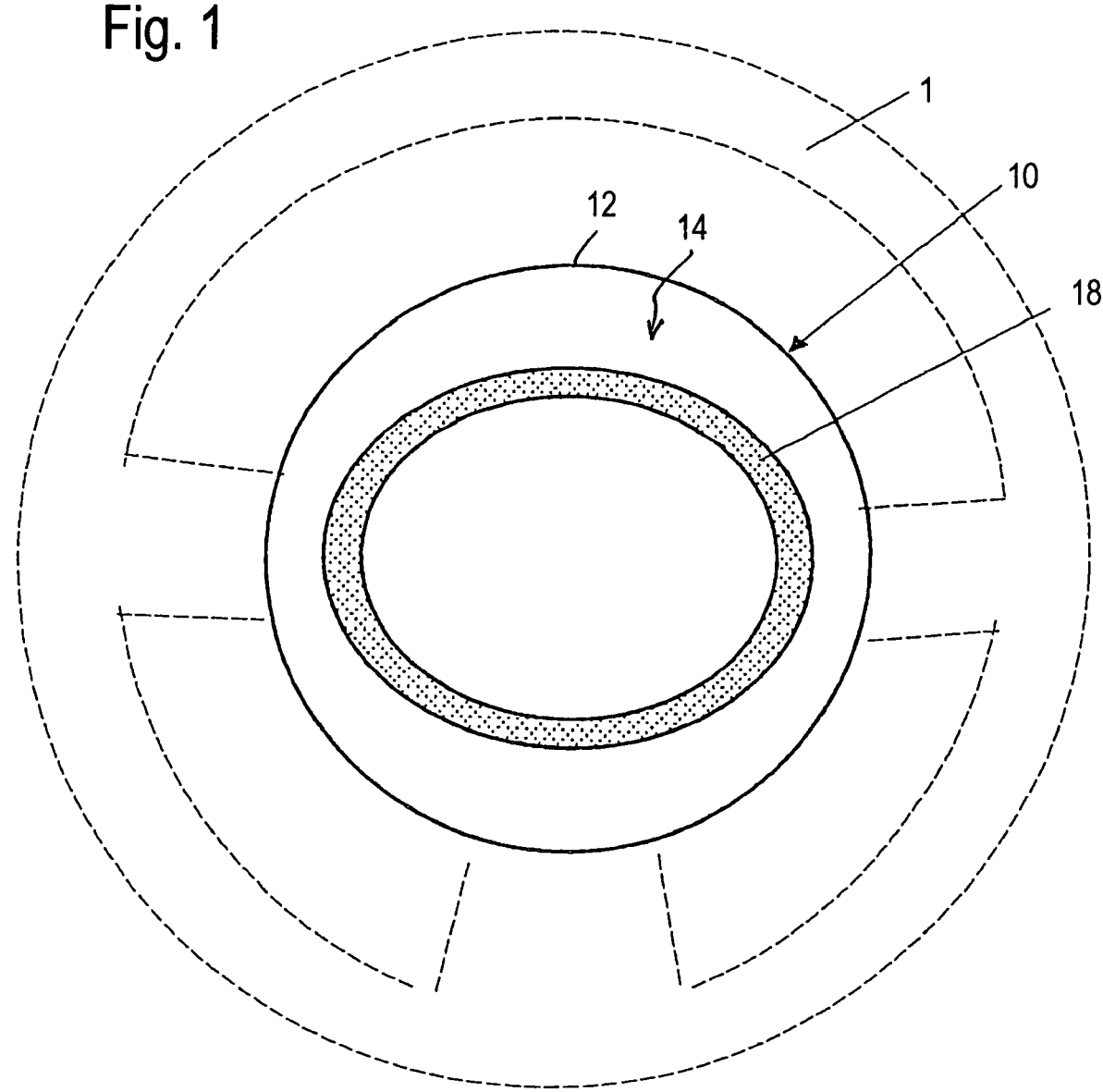
FIG. 1 shows a top view onto a steering wheel with a gas bag cover according to the invention.

FIGS. 1 to 4 show a gas bag cover 10 according to the invention for a vehicle occupant restraint system, the gas bag cover covering a driver's gas bag module (not shown) arranged in the hub of a steering wheel 1 towards a vehicle occupant. The gas bag cover 10 comprises a plastic cap 12 having a front face 14 facing the vehicle occupant and a rear face 16 facing a gas bag 17 (schematically shown in FIG. 2). Provided on the front face 14 of the plastic cap 12 is a decorative element 18 which is made of the same flexible plastic material as the plastic cap 12 and is welded to it. Alternatively, the decorative element 18 could have a metal core which is coated with plastic on the outside, e.g. by insert molding.

As can be seen from FIG. 1, the decorative element 18 is formed by a closed curve, in this case an oval, and, compared with the plastic cap 12, is of relatively large dimensions in that its measurements (largest external dimension) correspond to at least a third, in the present case even more than half, of the largest external dimension of the plastic cap 12. Instead of an oval, it would of course also be possible to use a ring, a trapezoid or a decorative element 18 covering an area.

Figure 2:
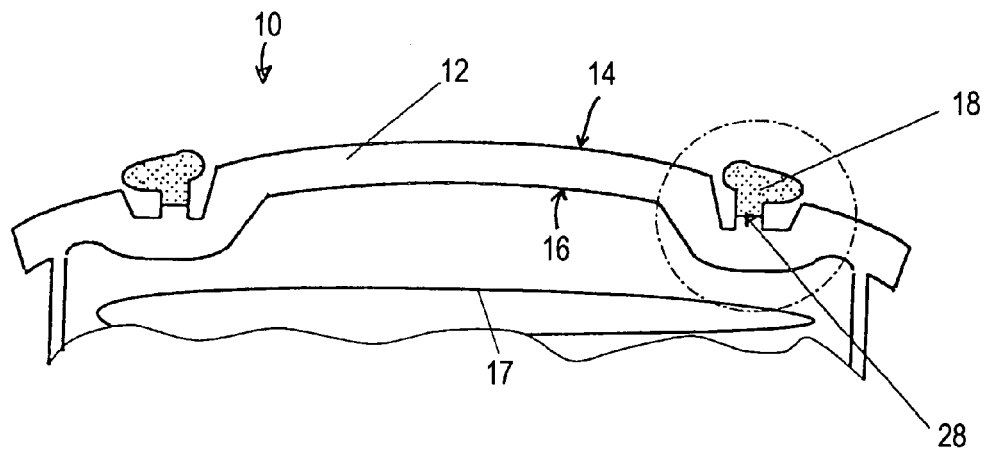
FIG. 2 shows a sectional view of the gas bag cover from FIG. 1.
Figure 3:
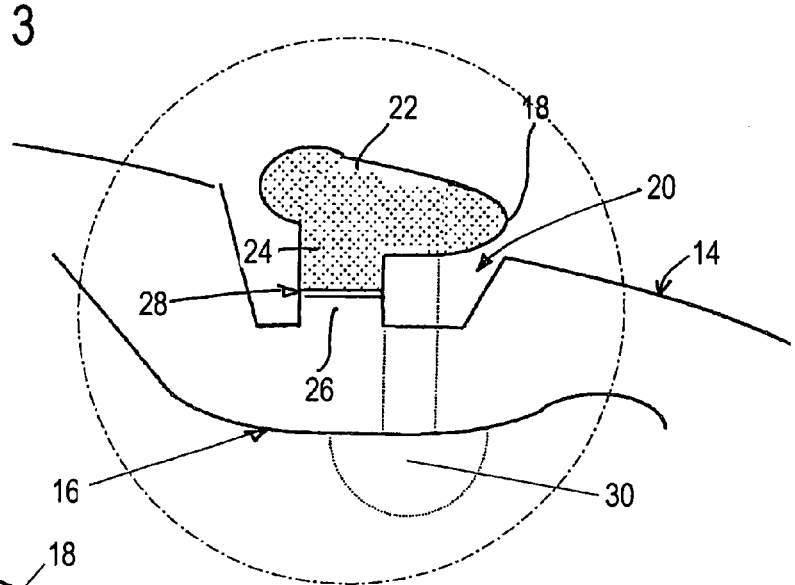
FIG. 3 shows an enlarged detail of the gas bag cover from FIG. 2.
Figure 4:
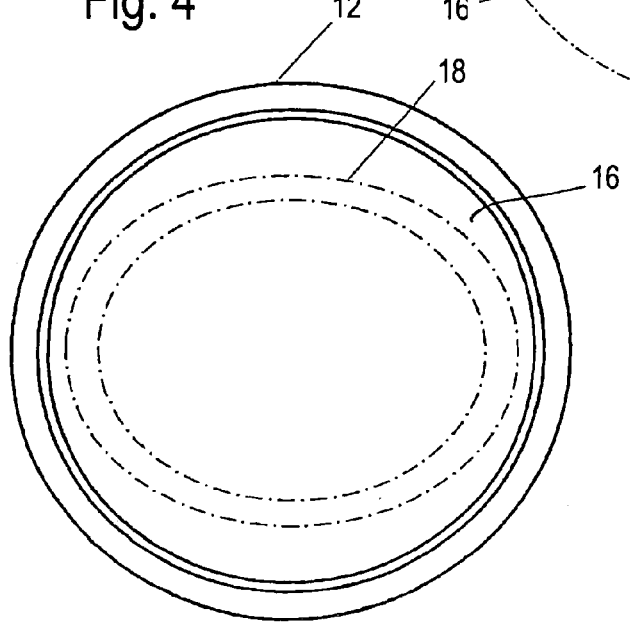
FIG. 4 shows a top view onto the rear face, facing a gas bag, of the gas bag cover from FIGS. 1 and 2.

As is apparent from FIGS. 2 and 3, the front face 14 of the plastic cap 12 has a recessed portion 20 in the form of a groove, in which the decorative element 18 is arranged and from which it partially projects by its visible portion 22. On the side facing away from the visible portion 22 of the decorative element 18, an extension 24 is integrally molded with the decorative element 18, the extension 24 being welded to a matching extension 26 of the plastic cap 12 which is integrally molded in the recessed portion 20. Both extensions 24, 26 extend into the welding zone 28 between the decorative element 18 and the plastic cap 12. In a top view, the extensions 24, 26 have a smaller width than the widened outer portion 22.

Figure 5:
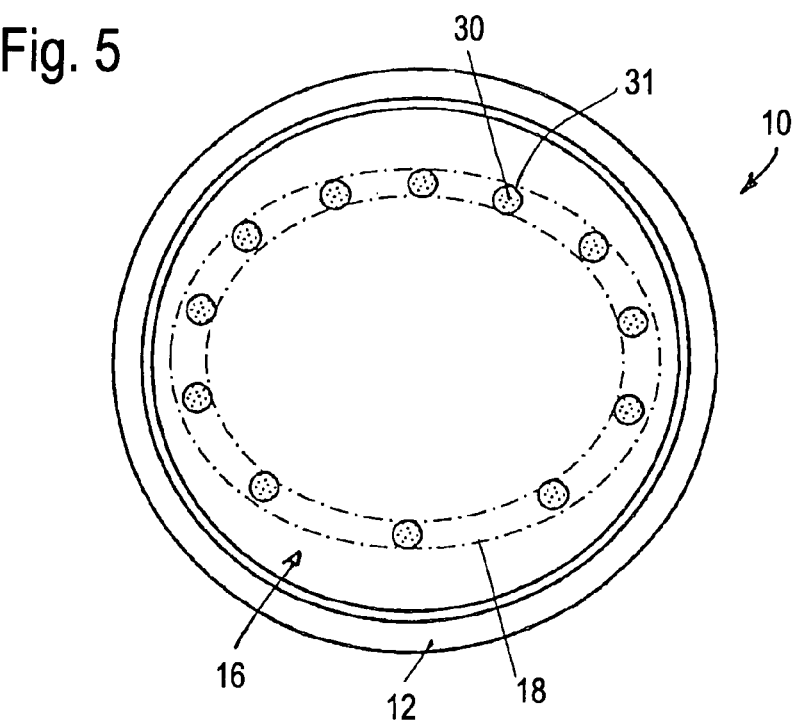
FIG. 5 shows a top view onto the rear face of a gas bag cover according to the prior art.

At least in its visible portion 22, the decorative element 18 has a color on the outside which differs from that of the front face 14 of the plastic cap 12; in particular, the external color of the decorative element 18 is constituted by a metallic or some other suitable coating. The rivets 30 commonly used in the prior art (cf. FIG. 3, indicated in dotted lines, as well as FIG. 5) for attaching the decorative element 18 to the plastic cap 12, and matching apertures 31 provided in the plastic cap 12 in the region of the decorative element 18 may be dispensed with. As may be seen in FIG. 4, the rear side 16 of the plastic cap 12 is designed to be closed and smooth.

When manufacturing the gas bag cover 10, the plastic cap 12 and the decorative element 18 are produced from the same plastic material as separate components, for instance in a casting or foaming process. In terms of its color, the decorative element 18 is designed independently here, which may be effected immediately during the casting or foaming process. As an alternative, one or both of the components may be provided with a coating. Then, both parts are welded to one another in the region of the extensions 24, 26, for example by heated tool welding.

Figure 6:
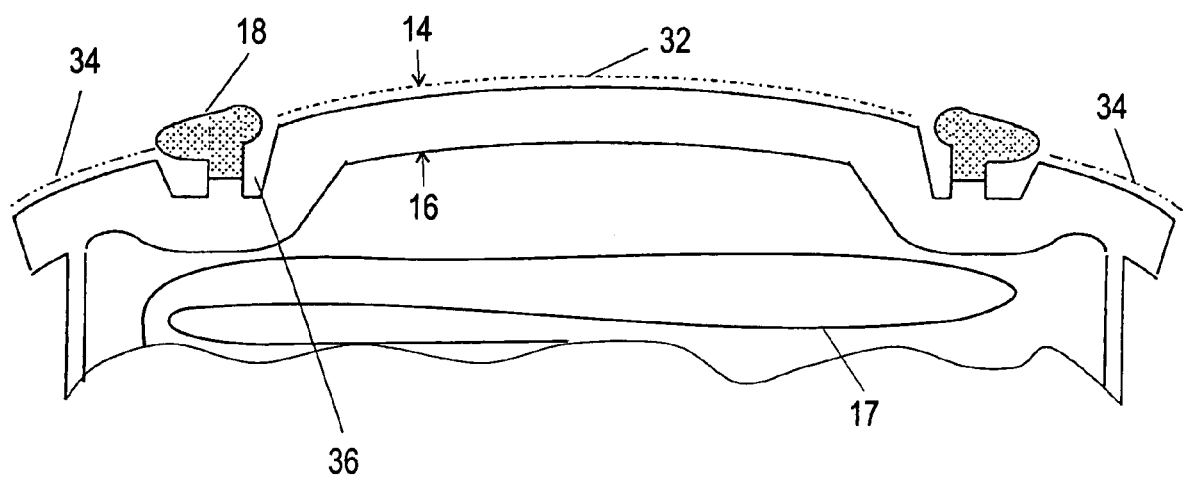
FIG. 6 shows a sectional view of a gas bag cover which is slightly modified in comparison with FIGS. 1 to 4.

FIG. 6 shows a slightly modified configuration of the gas bag cover 10, in which the plastic cap 12, at least on its front face 14, has a plurality of regions 32, 34 having different colors. More particularly, the color in the inner region 32 of the decorative element 18 differs from that in the outer region 34. The different colors may be applied by painting or coating, for example, or else the plastic cap 12 is produced from plastic materials of different colors from the start. In the configuration of FIG. 6, the decorative element 18 conceals a parting line 36 between the regions 32 and 34.

The invention claimed is:

1. A gas bag cover for a vehicle occupant restraint system, comprising
    a plastic cap (12) having a front face (14) and a rear face (16) facing a gas bag (17), and
    a decorative element (18) provided on said front face (14), said decorative element (18) being welded directly to said plastic cap (12),
    wherein said plastic cap (12) has no apertures whatsoever in a region of said decorative element (18).

2. The gas bag cover according to claim 1, wherein said decorative element (18) has an outer coating made of plastic.

3. The gas bag cover according to claim 1, wherein, in a top view, said decorative element (18) and said plastic cap (12) each have external dimensions, said external dimensions of said decorative element (18) corresponding to at least a third of said external dimensions of said plastic cap (12).

4. The gas bag cover according to claim 1, wherein a recessed portion (20) is provided, said front face (14) of said plastic cap (12) having said recessed portion (20) in which said decorative element (18) is arranged.

5. The gas bag cover according to claim 1, wherein at least on said front face (14) of said plastic cap (12), said plastic cap (12) has a plurality of regions (32, 34) having different colors.

6. The gas bag cover according to claim 1, wherein said front face (14) of said plastic cap (12) includes a groove (20) in which the decorative element (18) is arranged.

7. The gas bag cover according to claim 6, wherein the groove (20) has a substantially U-shaped cross-section.

8. A gas bag cover for a vehicle occupant restraint system, comprising
    a plastic cap (12) having a front face (14) and a rear face (16) facing a gas bag (17),
    a decorative element (18) provided on said front face (14), said decorative element (18) being welded directly to said plastic cap (12),
    an integrally molded extension (26), and
    a welding zone (28), said plastic cap (12) having said integrally molded extension (26) which extends into said welding zone (28).

9. The gas bag cover according to claim 8, wherein said decorative element (18) has an outer coating made of plastic.

10. The gas bag cover according to claim 8, wherein, in a top view, said decorative element (18) and said plastic cap (12) each have external dimensions, said external dimensions of said decorative element (18) corresponding to at least a third of said external dimensions of said plastic cap (12).

11. The gas bag cover according to claim 8, wherein a recessed portion (20) is provided, said front face (14) of said plastic cap (12) having said recessed portion (20) in which said decorative element (18) is arranged.

12. The gas bag cover according to claim 8, wherein at least on said front face (14) of said plastic cap (12), said plastic cap (12) has a plurality of regions (32, 34) having different colors.

13. A gas bag cover for a vehicle occupant restraint system, comprising
    a plastic cap (12) having a front face (14) and a rear face (16) facing a gas bag (17),
    a decorative element (18) provided on said front face (14), said decorative element (18) being welded directly to said plastic cap (12),
    an integrally molded extension (26), and
    a welding zone (28), said decorative element (18) having said integrally molded extension (24) which extends into said welding zone (28).

14. The gas bag cover according to claim 13, wherein said decorative element (18) has an outer coating made of plastic.

15. The gas bag cover according to claim 13, wherein, in a top view, said decorative element (18) and said plastic cap (12) each have external dimensions, said external dimensions of said decorative element (18) corresponding to at least a third of said external dimensions of said plastic cap (12).

16. The gas bag cover according to claim 13, wherein a recessed portion (20) is provided, said front face (14) of said plastic cap (12) having said recessed portion (20) in which said decorative element (18) is arranged.

17. The gas bag cover according to claim 13, wherein at least on said front face (14) of said plastic cap (12), said plastic cap (12) has a plurality of regions (32, 34) having different colors.

18. A method of manufacturing a gas bag cover (10), comprising following steps:
producing a plastic cap (12);
producing a decorative element (18); and
welding said decorative element (18) directly to said plastic cap (12) along a welding zone on the front face of the plastic cap.

19. The method according to claim 18, wherein said decorative element (18) is connected with said plastic cap (12) by heated tool welding.

20. The method according to claim 18, wherein at least one of said decorative element (18) and said plastic cap (12) are coated prior to a welding step.

21. A gas bag cover for a vehicle occupant restraint system, comprising
a plastic cap (12) having a front face (14) and a rear face (16) facing a gas bag (17), and
a decorative element (18) arranged in a groove (20) on said front face (14), said decorative element (18) being welded to said plastic cap (12),
wherein the front face (14) includes an extension (26) which extends from the groove (20), the decorative element (18) having an extension (24) welded to the extension (26) of the front face (14).

22. A gas bag cover for a vehicle occupant restraint system, comprising
a plastic cap (12) having a front face (14) and a rear face (16) facing a gas bag (17),
a decorative element (18) provided on said front face (14), said decorative element (18) being welded directly to said plastic cap (12) along a welding zone on said front face of said plastic cap.

23. The gas bag cover according to claim 22, wherein said front face (14) of said plastic cap (12) includes a groove (20) in which the decorative element (18) is arranged.

* * * * *